(12) United States Patent
Kawaguchi

(10) Patent No.: US 9,764,421 B2
(45) Date of Patent: Sep. 19, 2017

(54) LASER PROCESSING METHOD

(71) Applicant: HAMAMATSU PHOTONICS K.K., Hamamatsu-shi, Shizuoka (JP)

(72) Inventor: Daisuke Kawaguchi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 176 days.

(21) Appl. No.: 14/779,652

(22) PCT Filed: Mar. 18, 2014

(86) PCT No.: PCT/JP2014/057324
§ 371 (c)(1),
(2) Date: Sep. 24, 2015

(87) PCT Pub. No.: WO2014/156828
PCT Pub. Date: Oct. 2, 2014

(65) Prior Publication Data
US 2016/0039044 A1  Feb. 11, 2016

(30) Foreign Application Priority Data
Mar. 28, 2013  (JP) .................. 2013-069431

(51) Int. Cl.
*B23K 26/00* (2014.01)
*B23K 26/364* (2014.01)
(Continued)

(52) U.S. Cl.
CPC .......... *B23K 26/0063* (2013.01); *B23K 26/00* (2013.01); *B23K 26/0006* (2013.01);
(Continued)

(58) Field of Classification Search
CPC ....... B23K 26/00; B23K 26/57; B23K 26/364
(Continued)

(56) References Cited

U.S. PATENT DOCUMENTS

2009/0166782 A1* 7/2009 Lake .................. B28D 5/022
                                                        257/432
2010/0089883 A1    4/2010 Umetsu et al.
(Continued)

FOREIGN PATENT DOCUMENTS

| CN | 101100018 | 1/2008 |
| CN | 101400475 | 4/2009 |

(Continued)

OTHER PUBLICATIONS

International Preliminary Report on Patentability dated Oct. 8, 2015 for PCT/JP2014/057324.

*Primary Examiner* — Samuel M Heinrich
(74) *Attorney, Agent, or Firm* — Drinker Biddle & Reath LLP

(57) ABSTRACT

It comprises a first step of preparing an object; a second step of forming a modified region in a first member along a line by irradiating the first member with laser light while using a front face of the object as a laser light entrance surface; a third step of forming a processing scar in a bonding layer along the line by irradiating the bonding layer with laser light while using the front face as a laser light entrance surface; and a fourth step, after the first to third steps, of forming a modified region in a second member along the line by irradiating the second member with laser light while using a rear face of the object as a laser light entrance surface; the fourth step uses the processing scar as a reference for alignment of a laser light irradiation position with respect to the second member.

3 Claims, 14 Drawing Sheets

(51) Int. Cl.
- *B23K 26/57* (2014.01)
- *C03B 33/02* (2006.01)
- *C03B 33/07* (2006.01)
- *B23K 26/38* (2014.01)
- *B23K 26/40* (2014.01)
- *B23K 103/00* (2006.01)

(52) U.S. Cl.
CPC ........ *B23K 26/0057* (2013.01); *B23K 26/364* (2015.10); *B23K 26/38* (2013.01); *B23K 26/40* (2013.01); *B23K 26/57* (2015.10); *C03B 33/0222* (2013.01); *C03B 33/076* (2013.01); *B23K 2203/56* (2015.10)

(58) Field of Classification Search
USPC ........... 219/121.67–121.72, 121.85; 438/463
See application file for complete search history.

(56) References Cited

U.S. PATENT DOCUMENTS

| | | | |
|---|---|---|---|
| 2013/0095581 A1* | 4/2013 | Lee | H01L 33/0095 438/26 |
| 2013/0112650 A1* | 5/2013 | Karam | B32B 37/06 216/13 |

FOREIGN PATENT DOCUMENTS

| | | |
|---|---|---|
| CN | 101796698 | 8/2010 |
| EP | 1 609 558 | 12/2005 |
| EP | 1 609 558 A4 | 7/2009 |
| JP | 2004-343008 A | 12/2004 |
| JP | 2006-167804 A | 6/2006 |
| JP | 2010-177277 A | 8/2010 |
| JP | 2011-108856 A | 6/2011 |
| JP | 2011-240349 | 12/2011 |

* cited by examiner

Fig.8
(a)
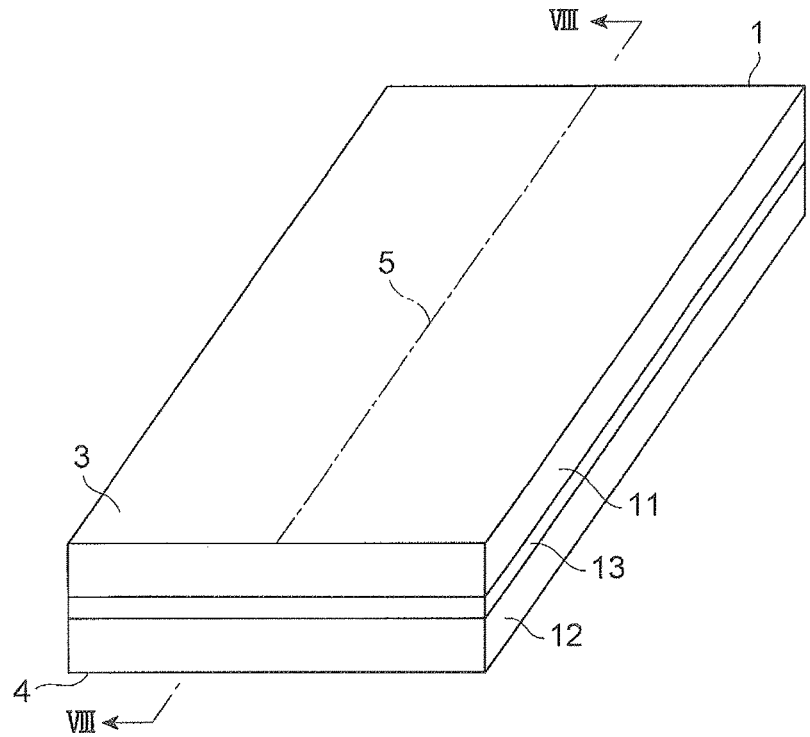
(b)
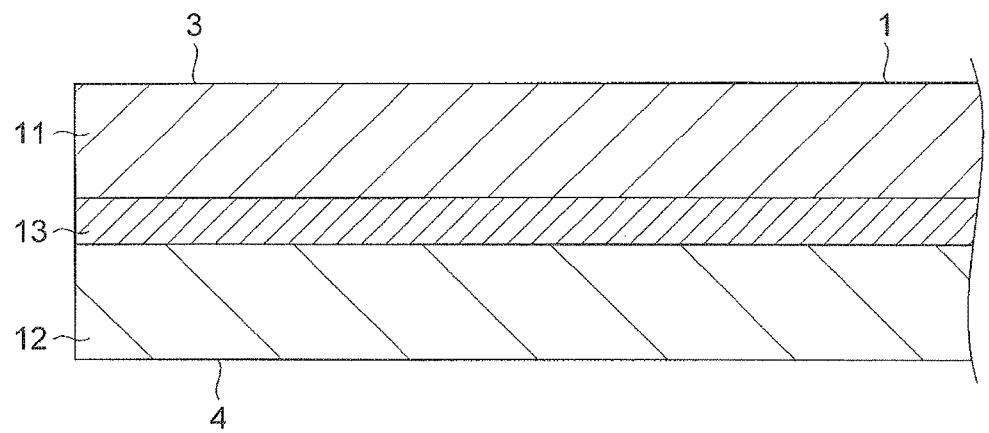

Fig.9
(a)
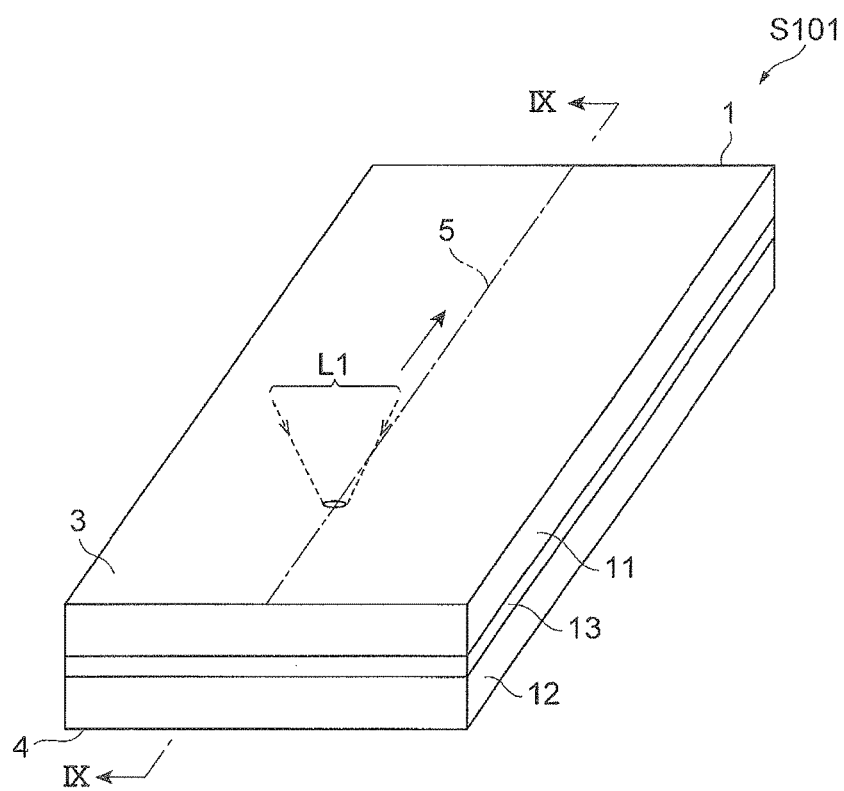
(b)
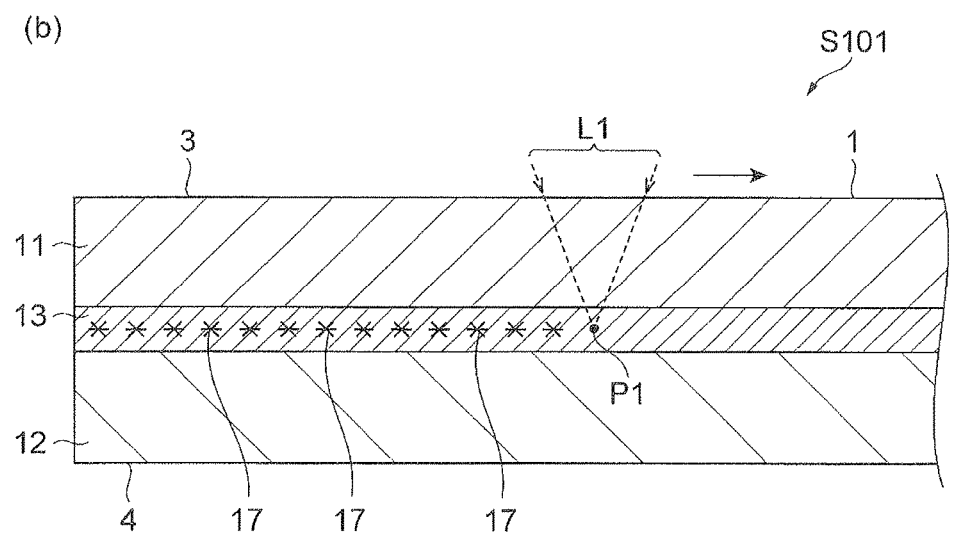

*Fig.10*
(a)
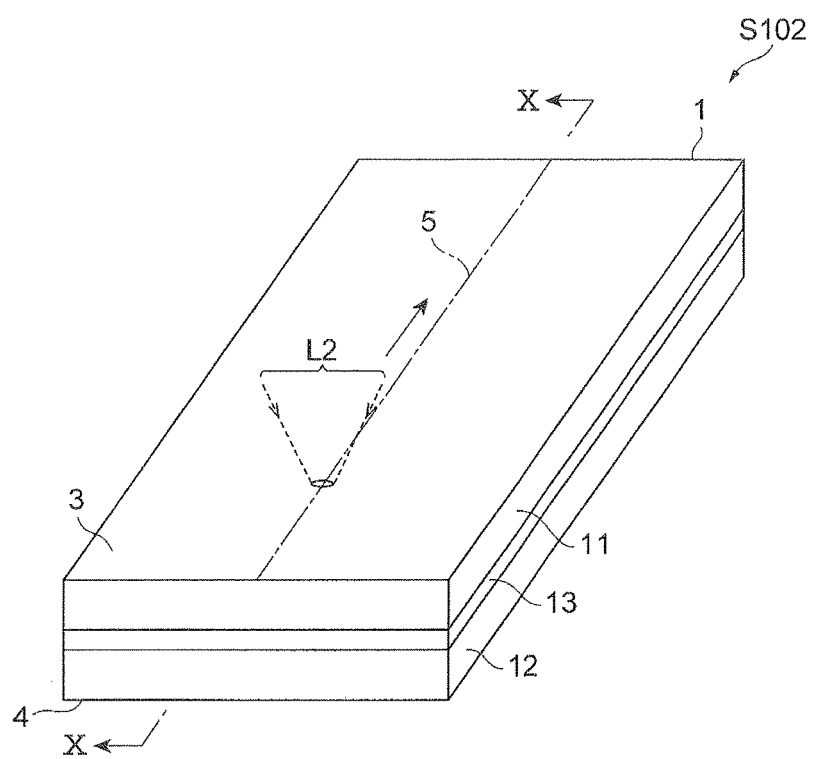
(b)
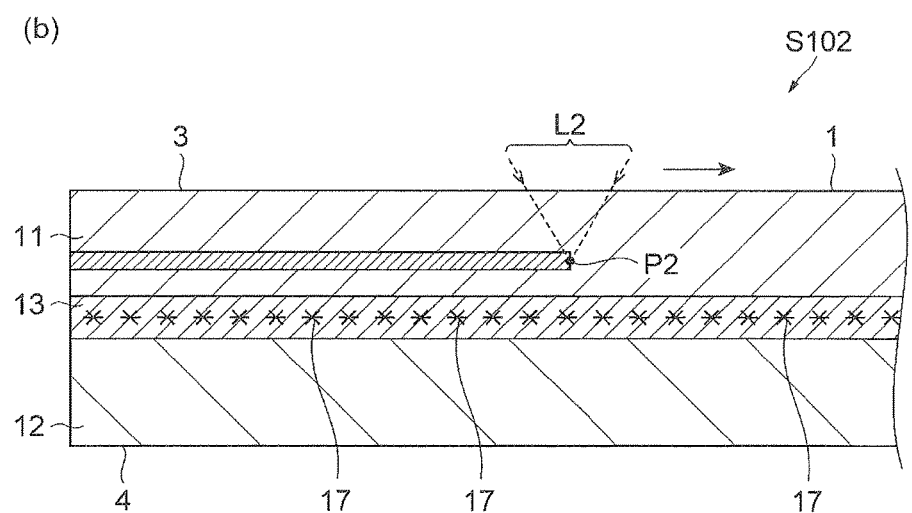

*Fig.11*
(a)
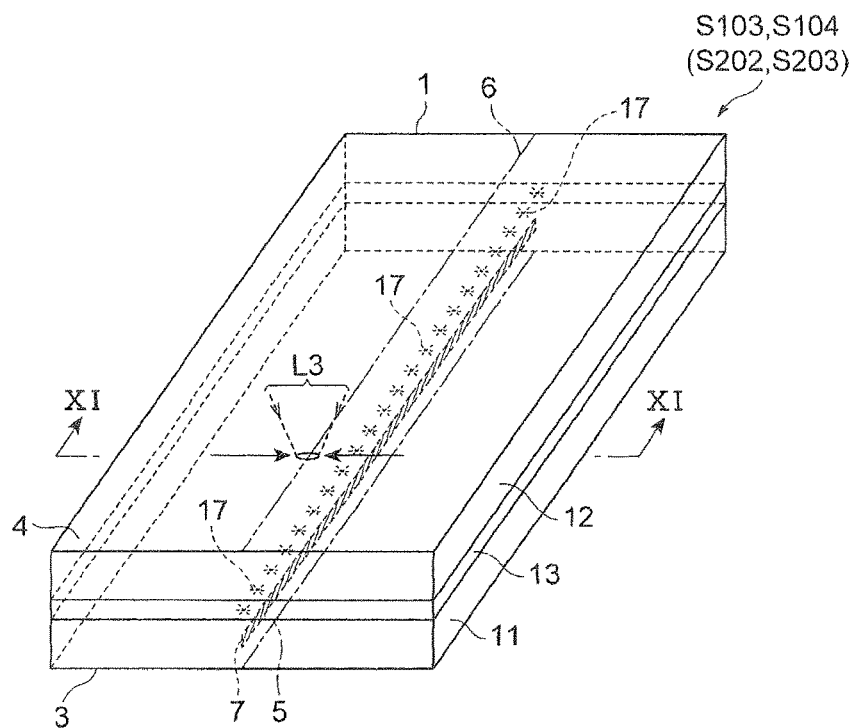
(b)
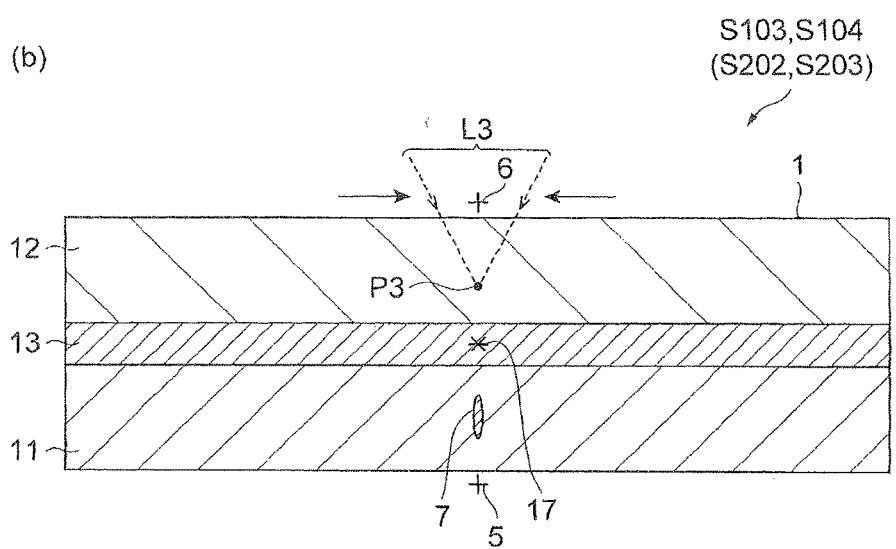

Fig.12
(a)
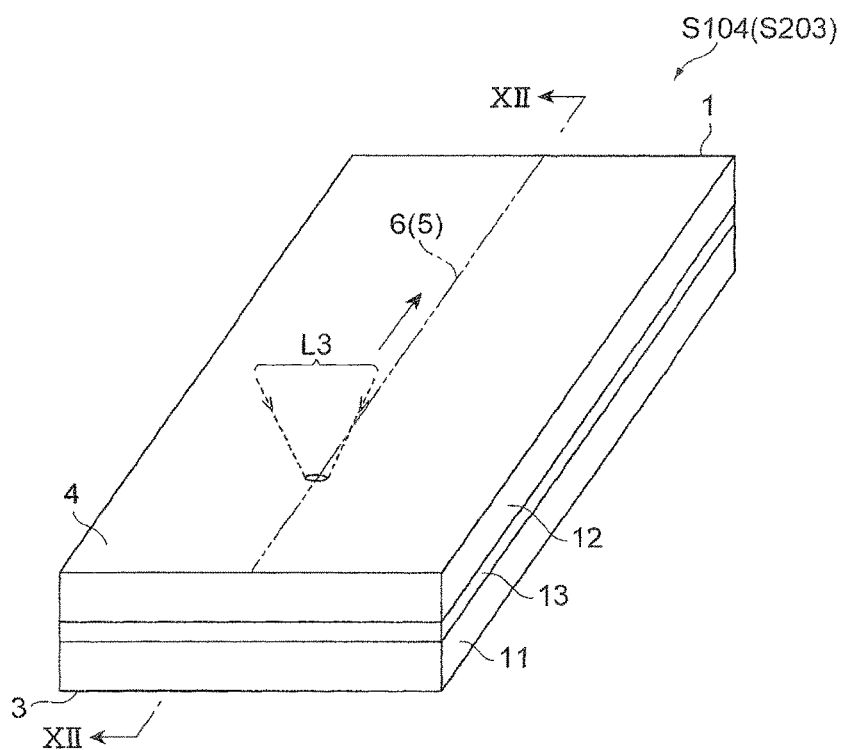
(b)
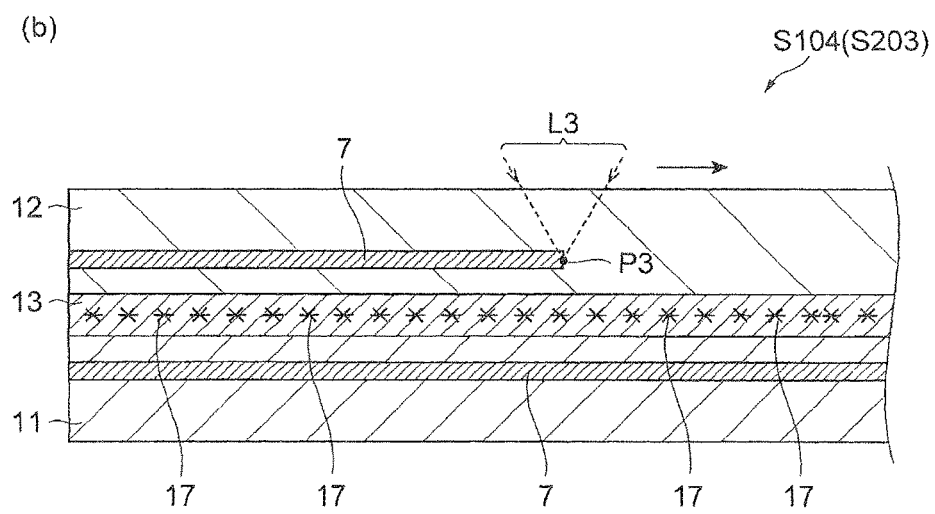

Fig.14
(a)
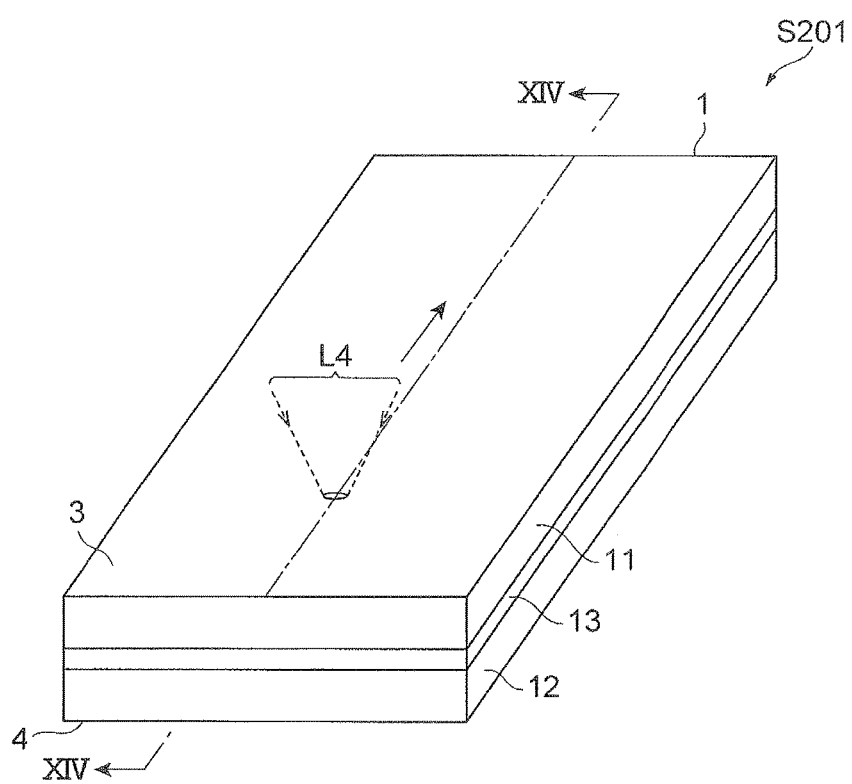
(b)
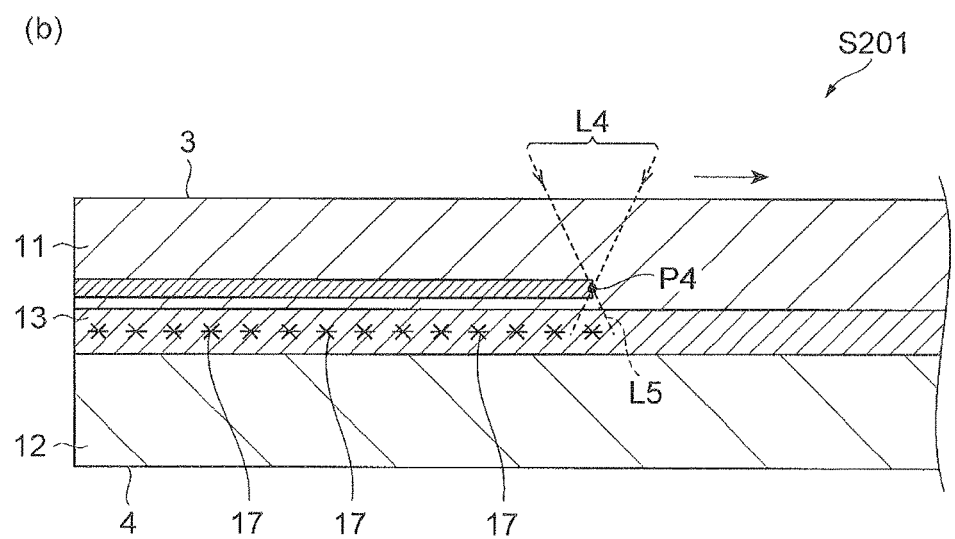

LASER PROCESSING METHOD

TECHNICAL FIELD

One aspect of the present invention relates to a laser processing method for processing an object to be processed having a pair of planar members stacked on top of each other and a bonding layer bonding them to each other.

BACKGROUND ART

Patent Literature 1 discloses a method for dividing an object to be processed which utilizes a laser light beam. In this object dividing method, while a laser light beam irradiating the object from one side thereof is converged near the other surface of the object, the object and the laser light beam are moved relative to each other along a division line, so as to form a modified region in the object along the division line. Thereafter, in the object dividing method, a bending moment is applied to the object about the division line, so as to break the object along the division line.

CITATION LIST

Patent Literature

Patent Literature 1: Japanese Patent Application Laid-Open No. 2004-343008

SUMMARY OF INVENTION

Technical Problem

Meanwhile, it has currently been demanded to perform laser processing for an object to be processed which is constructed by attaching a pair of planar members (first and second planar members) to each other with a predetermined bonding layer interposed therebetween. For example, the following method may be considered for performing laser processing for such an object to be processed. At first, laser light incident on the first planar member side irradiates the second planar member through the first planar member and bonding layer, so as to form a modified region in the second planar member along a desired line to process. Thereafter, laser light incident on the first planar member side similarly irradiates the first planar member, so as to form a modified region in the first planar member along the line to process.

However, there is a case where a material which is hard to transmit light therethrough, examples of which include metals and predetermined resins, is used as a bonding layer bonding the first and second planar members to each other. When laser-processing an object to be processed having such a bonding layer, it is difficult for the second planar member to be irradiated with laser light from the first planar member side through the bonding layer as mentioned above. Therefore, in such a case, after forming the modified region in the first planar member by irradiating the first planar member with laser light from the first planar member side, the object may be reversed, so that the second planar member is irradiated with laser light from the second planar member side, so as to be formed with the modified region.

In this case, when irradiating the second planar member with the laser light from the second planar member side so as to form the modified region in the second planar member, the position to be irradiated with the laser light is required to align with a processing line (a modified region formed along the line to process) formed beforehand in the first planar member; however, the bonding layer, which is hard to transmit light therethrough, interposed between the first and second planar members makes the processing line in the first planar member less recognizable through an IR camera, for example. As a result, the processing line in the first planar member and the processing line in the second planar member may fail to align with each other, thereby lowering the processing quality.

In view of such circumstances, it is an object of one aspect of the present invention to provide a laser processing method which can restrain the processing quality from lowering.

Solution to Problem

For solving the problem mentioned above, the laser processing method in accordance with one aspect of the present invention comprises a first step of preparing an object to be processed having first and second planar members stacked on top of each other and a bonding layer, arranged between the first and second planar members, bonding the first and second planar members to each other, the object being set with a line to process; a second step of forming a modified region in the first planar member along the line by irradiating the first planar member with laser light along the line while using a front face of the object on a side opposite from the bonding layer in the first planar member as a laser light entrance surface; a third step of forming a processing scar in the bonding layer along the line by irradiating the bonding layer with laser light along the line while using the front face of the object as a laser light entrance surface; and a fourth step, after the first to third steps, of forming a modified region in the second planar member along the line by irradiating the second planar member with laser light along the line while using a rear face of the object on a side opposite from the bonding layer in the second planar member as a laser light entrance surface; the fourth step irradiates the second planar member with the laser light along the line by using the processing scar formed in the bonding layer as a reference for alignment of a laser light irradiation position with respect to the second planar member.

This laser processing method irradiates a first planar member with laser light, so as to form a modified region in the first planar member along a line to cut, and irradiates a bonding layer bonding the first and second planar members to each other with laser light, so as to form a processing scar in the bonding layer along the line. When forming a modified region in the second planar member, the second planar member is irradiated with laser light along the line by using the processing scar formed in the bonding layer as a reference for alignment, so as to form a modified region in the second planar member along the line. Therefore, even when the bonding layer is made of a material which is hard to transmit light therethrough such as a metal or a predetermined resin, the processing line (the modified region along the line to process) in the first planar member, which is formed earlier, can accurately align with the processing line in the second planar member, which is formed later. Therefore, this laser processing method can restrain the processing quality from lowering.

The laser processing method in accordance with one aspect of the present invention may form the modified region in the first planar member by performing the second step after forming the processing scar in the bonding layer by performing the third step. In this case, before forming the modified region for the first planar member, the bonding layer located on the inner side of the object than is the first planar member is irradiated with laser light, so as to form the processing scar. This can deter the processing scar of the bonding layer from adversely affecting the modified region being formed in the first planar member by irradiation with laser light from the first planar member side.

The laser processing method in accordance with one aspect of the present invention may perform the third step by irradiating the bonding layer with leak light of the laser light irradiating the first planar member when performing the second step, so as to form the processing scar in the bonding layer. This can simultaneously perform the second step of forming the modified region in the first planar member and the third step of forming the processing scar in the bonding layer, thereby shortening the total processing time.

Advantageous Effects of Invention

One aspect of the present invention can provide a laser processing method which can restrain the processing quality from lowering.

BRIEF DESCRIPTION OF DRAWINGS

FIG. 8 is a diagram illustrating an object to be processed by the laser processing method;

FIG. 9 is a diagram for explaining a step of processing a bonding layer;

FIG. 10 is a diagram for explaining a step of processing a first planar member;

FIG. 11 is a diagram for explaining a step of transferring the object and a step of processing a second planar member;

FIG. 12 is a diagram for explaining a step of processing a second planar member;

FIG. 14 is a diagram for explaining a step of processing the first planar member and bonding layer.

DESCRIPTION OF EMBODIMENTS

Figure 1:
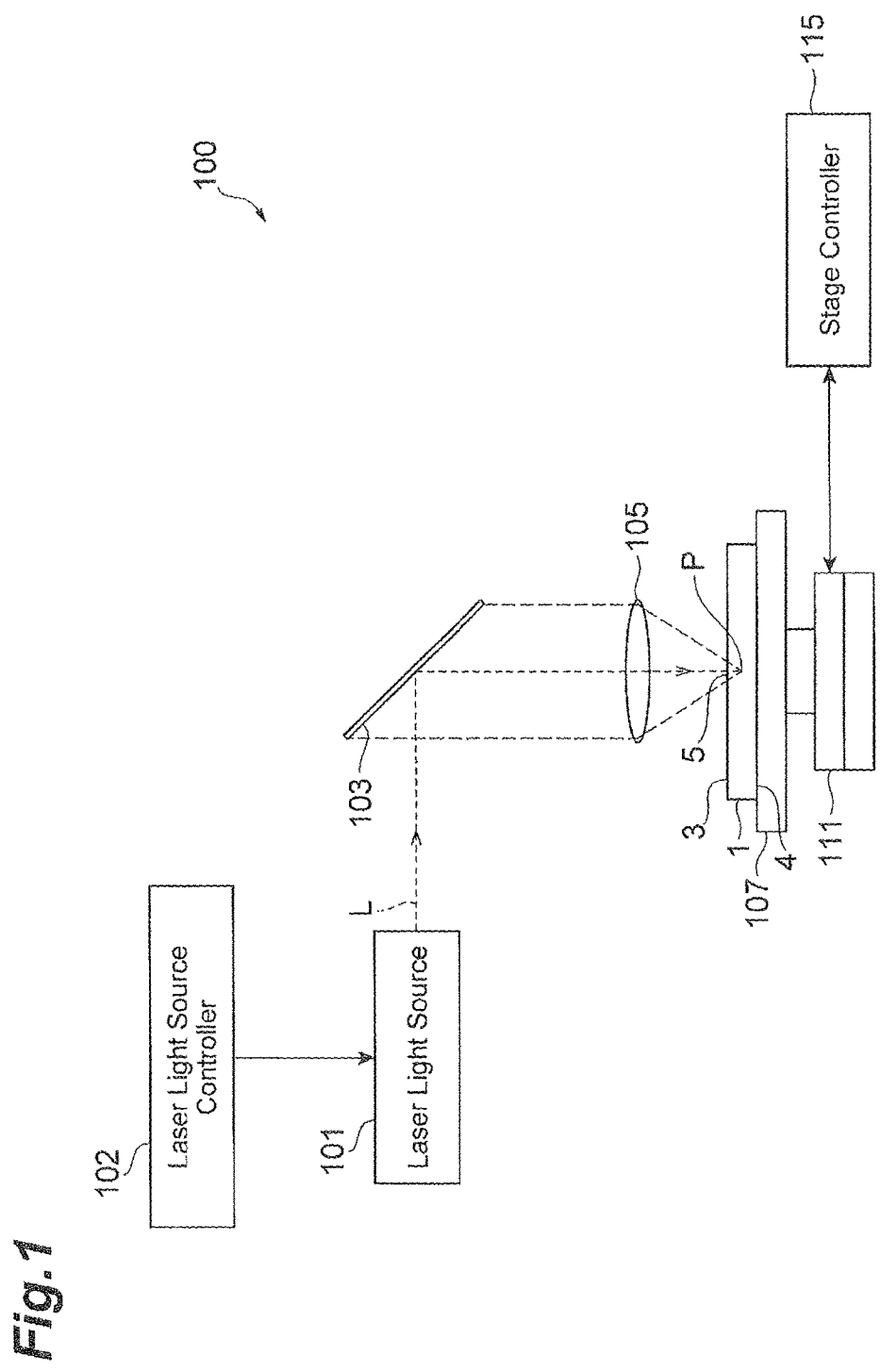
FIG. 1 is a schematic structural diagram of a laser processing device used for forming a modified region.

In the following, the laser processing method in accordance with one embodiment of one aspect of the present invention will be explained in detail with reference to the drawings. In the drawings, the same or equivalent constituents will be referred to with the same signs while omitting their overlapping descriptions.

The laser processing method in accordance with one embodiment of one aspect of the present invention includes a case where an object to be processed is irradiated with laser light along a line to cut (line to process) so as to form a modified region to become a cutting start point within the object along the line. Therefore, the forming of the modified region will be explained with reference to FIGS. 1 to 6 without limiting the material of the object.

As illustrated in FIG. 1, a laser processing device 100 comprises a laser light source 101 for causing laser light L to oscillate in a pulsating manner, a dichroic mirror 103 arranged such as to change the direction of the optical axis (optical path) of the laser light L by 90°, and a converging lens 105 for converging the laser light L. The laser processing device 100 further comprises a support table 107 for supporting an object to be processed 1 which is irradiated with the laser light L converged by the converging lens 105, a stage 111 for moving the support table 107, a laser light source controller 102 for regulating the laser light source 101 in order to adjust the output, pulse width, pulse waveform, and the like of the laser light L, and a stage controller 115 for regulating the movement of the stage 111.

In the laser processing device 100, the laser light L emitted from the laser light source 101 changes the direction of its optical axis by 90° with the dichroic mirror 103 and then is converged by the converging lens 105 into the object 1 mounted on the support table 107. At the same time, the stage 111 is shifted, so that the object 1 moves relative to the laser light L along a line to cut 5. This forms a modified region in the object 1 along the line 5.

Figure 2:
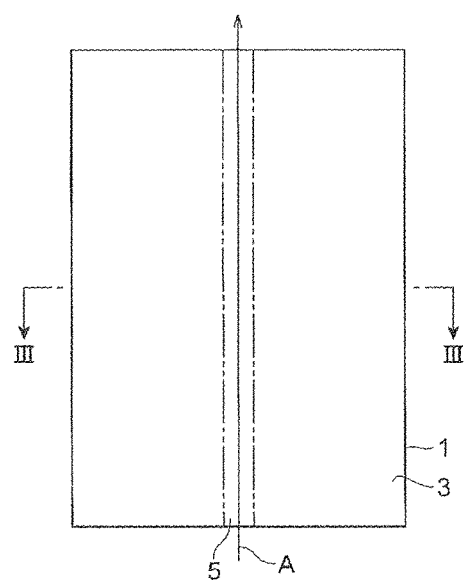
FIG. 2 is a plan view of an object to be processed for which the modified region is formed.
Figure 3:
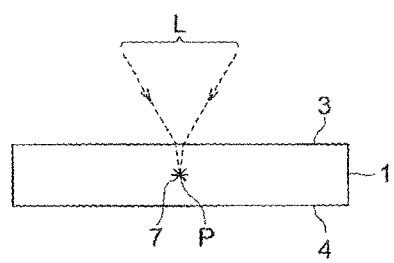
FIG. 3 is a sectional view of the object taken along the line III-III of FIG. 2.
Figure 4:
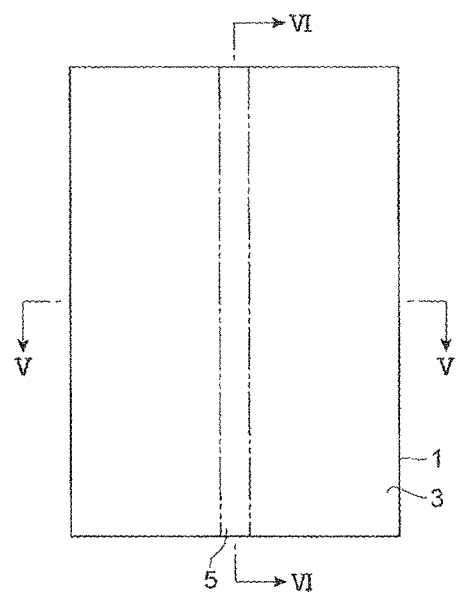
FIG. 4 is a plan view of the object after laser processing.
Figure 5:
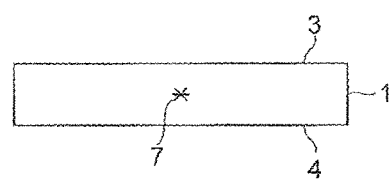
FIG. 5 is a sectional view of the object taken along the line V-V of FIG. 4.
Figure 6:
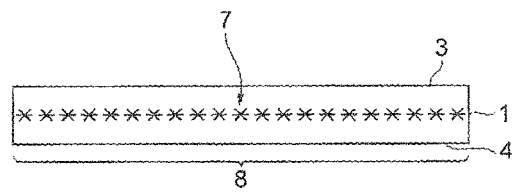
FIG. 6 is a sectional view of the object taken along the line VI-VI of FIG. 4.

Employed as the object 1 is a planar member (e.g., a substrate or a wafer) made of various materials (e.g., glass, semiconductor materials, and piezoelectric materials). As illustrated in FIG. 2, the line 5 for cutting the object 1 is set in the object 1. The line 5 is a virtual line extending straight. When forming a modified region within the object 1, the laser light L is relatively moved along the line 5 (i.e., in the direction of arrow A in FIG. 2) while locating a converging point P within the object 1 as illustrated in FIG. 3. This forms a modified region 7 within the object 1 along the line 5 as illustrated in FIGS. 4 to 6, whereby the modified region 7 formed along the line 5 becomes a cutting start region 8.

The converging point P is a position at which the laser light L is converged. The line 5 may be curved instead of being straight or a line actually drawn on a front face 3 of the object 1 without being restricted to the virtual line. The modified region 7 may be formed either continuously or intermittently. The modified region 7 may be formed either in rows or dots and is only required to be formed at least within the object 1. There are cases where fractures are formed from the modified region 7 acting as a start point, and the fractures and modified region 7 may be exposed at outer surfaces (the front face 3, rear face 4, and outer peripheral surface) of the object 1.

Here, the laser light L is absorbed in particular in the vicinity of the converging point P within the object 1 while being transmitted therethrough, whereby the modified region 7 is formed in the object 1 (i.e., internal absorption type laser processing). Therefore, the front face 3 of the object 1 hardly absorbs the laser light L and thus does not melt. In the case of forming a removing part such as a hole or groove by melting it away from the front face 3 (surface absorption type laser processing), the processing region gradually progresses from the front face 3 side to the rear face 4 side in general.

By the modified region formed in this embodiment are meant regions whose physical characteristics such as density, refractive index, and mechanical strength have attained states different from those of their surroundings. Examples of the modified region include molten processed regions, crack regions, dielectric breakdown regions, refractive index changed regions, and their mixed regions. Other examples of the modified region include areas where the density of the modified region has changed from that of an unmodified region and areas formed with a lattice defect in a material of the object (which may also collectively be referred to as high-density transitional regions).

The molten processed regions, refractive index changed regions, areas where the modified region has a density changed from that of the unmodified region, or areas formed with a lattice defect may further incorporate a fracture (fissure or microcrack) therewithin or at an interface between the modified and unmodified regions. The incorporated fracture may be formed over the whole surface of the modified region or in only a part or a plurality of parts thereof. Examples of the object 1 include substrates and wafers made of silicon, glass, LiTaO$_3$, and sapphire (Al$_2$O$_3$) and those containing such substrates and wafers.

This embodiment forms a plurality of modified spots (processing scars) along the line 5, thereby producing the modified region 7. The modified spots, each of which is a modified part formed by a shot of one pulse of pulsed laser light (i.e., one pulse of laser irradiation; laser shot), gather to yield the modified region 7. Examples of the modified spots include crack spots, molten processed spots, refractive index changed spots, and those in which at least one of them is mixed.

As for the modified spots, their size and lengths of fractures occurring therefrom can be controlled as necessary in view of the required cutting accuracy, the demanded flatness of cut surfaces, the thickness, kind, and crystal orientation of the object, and the like.

First Embodiment

Figure 7:
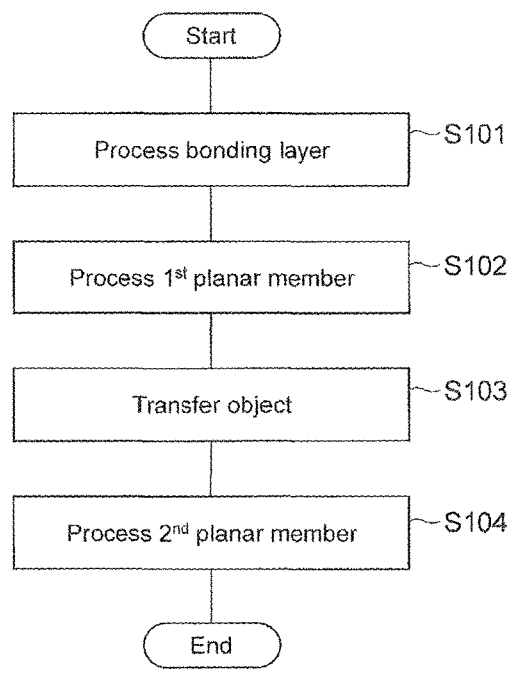
FIG. 7 is a flowchart illustrating main steps of the laser processing method in accordance with a first embodiment.

The laser processing method in accordance with the first embodiment of one aspect of the present invention will now be explained. The laser processing method in accordance with this embodiment processes an object to be processed constructed by attaching a pair of planar members to each other. The following will explain a case of cutting such an object along a desired line to cut (line to process) in particular. FIG. 7 is a flowchart illustrating main steps of the laser processing method in accordance with the first embodiment. FIG. 8 is a diagram illustrating the object to be processed by the laser processing method. Here, FIG. 8(b) is a partial sectional view taken along the line VIII-VIII of FIG. 8(a).

As illustrated in FIG. 8, the object 1 is prepared at first (first step) in this laser processing method. An example of the object 1 is a work for a predetermined functional device. The object 1 has a first planar member 11, a second planar member 12, and a bonding layer 13. The first and second planar members 11, 12 are stacked on top of each other. The bonding layer 13 is arranged between the first and second planar members 11, 12. The bonding layer 13 bonds the first and second planar members 11, 12 to each other.

Here, the surface on the side opposite from the bonding layer 13 in the first planar member 11 is the front face 3 of the object 1, while the surface on the side opposite from the bonding layer 13 in the second planar member 12 is the rear face 4 of the object 1. The front face 3 of the object 1 faces the converging lens 105 (see FIG. 1). The object 1 is set with a straight line to cut 5 extending from one end thereof to the other end.

The first and second planar members 11, 12 are made of glass or silicon, for example. The first and second planar members 11, 12 may be made of the same material or materials different from each other. Materials constituting the first and second planar members 11, 12 and their forms are selected as appropriate according to the desired functional device. Here, the first and second planar members 11, 12 exhibit a substantially rectangular planar form. Therefore, the object 1 also has a substantially rectangular planar form as a whole.

Any material which can attach and bond the first and second planar members 11, 12 to each other may be used as a material for constituting the bonding layer 13. More specific examples for use as the material constituting the bonding layer 13 include metals (e.g., Au) and resins (e.g., polyimide). In particular, there is a case where the bonding layer 13 is constituted by a material which is hard to transmit therethrough processing laser light or observation light in IR cameras and the like (e.g., made of a metal such as Au as mentioned above or a thickly applied resin such as polyimide).

Next, as illustrated in FIGS. 7 and 9, the bonding layer 13 is processed (step S101: third step). FIG. 9 is a diagram for explaining a step of processing the bonding layer. In particular, FIG. 9(b) is a partial sectional view taken along the line IX-IX of FIG. 9(a). This step S101 forms processing scars (damage scars: modified parts) 17 in the bonding layer 13 by irradiating the bonding layer 13 with laser light L1 through the first planar member 11 from the first planar member 11 side. An example of the modification comprises softening by heating upon irradiation with laser light and solidification by subsequent cooling.

More specifically, this step S101 initially locates a converging point P1 of the laser light L1 within the bonding layer 13 while using the front face (surface on the side opposite from the bonding layer 13 in the first planar member 11) 3 of the object 1 as an entrance surface for the laser light L1. In this state, the object 1 is moved relative to the laser light L1, so that the bonding layer 13 is irradiated (scanned) with the laser light L1 along the line 5.

This forms processing scars 17 within the bonding layer 13 along the line 5 at intervals corresponding to the pulse pitch of the laser light L1 ((relative moving speed of the object 1 with respect to the laser light L1)/(frequency of pulse oscillation of the laser light L1)), for example. This step S101 forms the processing scars 17 substantially throughout the length of the bonding layer 13 by irradiating the object 1 from one end thereof to the other end with the laser light L1. At this time, irradiation conditions for the laser light L1 may be adjusted such that the processing scars 17 reach not only the inside of the bonding layer 13 but the bonded interfaces between the bonding layer 13 and the first and second planar members 11, 12 (the second planar member 12 in particular) as well or the processing scars 17 are continuous with each other.

When thus formed in the bonding layer 13 along the line 5, the processing scar 17 is exposed at an end face (cut surface) of each chip formed upon cutting the object 1 along the line 5. However, since the bonding between the first and second planar members 11, 12 in each chip is done by the whole surface of the bonding layer 13, the processing scar 17 at the end face of each chip does not lower the bonding strength between the first and second planar members 11, 12. Since the processing scars 17 are formed by modifying the bonding layer 13 upon irradiation with the laser light L1 alone, the bonding layer 13 is kept from producing dust and partly dropping out or peeling off when the object 1 is cut along the line 5.

Subsequently, as illustrated in FIGS. 7 and 10, the first planar member 11 is processed (step S102: second step). FIG. 10 is a diagram for explaining a step of processing the first planar member. In particular, FIG. 10(b) is a partial sectional view taken along the line X-X of FIG. 10(a). This step S102 forms a modified region 7 in the first planar member 11 by irradiating the first planar member 11 with laser light L2 from the first planar member 11 side.

More specifically, this step S102 initially locates a converging point P2 of the laser light L2 within the first planar member 11 while using the front face 3 of the object 1 as an entrance surface for the laser light L2. In this state, the object 1 is moved relative to the laser light L2, so that the first planar member 11 is irradiated (scanned) with the laser light L2 along the line 5. This forms the modified region 7 within the first planar member 11 along the line 5. This step S102 forms the modified region 7 substantially throughout the length of the first planar member 11 by irradiating the object 1 from one end thereof to the other end with the laser light L2. This step S102 may adjust the position at which the modified region 7 is formed in the thickness direction of the first planar member 11 or form a plurality of rows of modified regions 7 in the first planar member 11 according to the material and thickness of the object 1 including the first planar member 11, its desired cutting accuracy, and the like.

Then, as illustrated in FIGS. 7 and 11, the object 1 is transferred (step S103). That is, this step S103 reverses the object 1, so that the rear face (surface on the side opposite from the bonding layer 13 in the second planar member 12) 4 of the object 1 faces the converging lens 105. FIG. 11 is a diagram for explaining a step of transferring the object and a step of processing the second planar member. In particular, FIG. 11(b) is a partial sectional view taken along the line XI-XI of FIG. 11(a).

Thereafter, as illustrated in FIGS. 7, 11, and 12, the second planar member 12 is processed (step S104: fourth step). FIG. 12 is a diagram for explaining a step of processing the second planar member. In particular, FIG. 12(b) is a partial sectional view taken along the line XII-XII of FIG. 12(a). This step S104 forms a modified region 7 in the second planar member 12 by irradiating the second planar member 12 with laser light L3 from the second planar member 12 side.

For this purpose, as illustrated in FIG. 11, this step S104 initially aligns the irradiation position of the laser light L3 (the position of a converging point P3 of the laser light L3) with respect to the laser light L3) in directions (i.e., directions of arrows in the drawing) intersecting the thickness direction of the second planar member 12 and the extending direction of the line 5. More specifically, in order for a processing line 6 of the first planar member 11 formed in the earlier step S103 and a processing line (modified region formed in the second planar member 12 along the line 5) formed in the second planar member 12 in this step S104 to align with each other, the irradiation position of the laser light L3 with respect to the second planar member 12 is set on the processing line 6 of the first planar member 11. For convenience, FIG. 11 illustrates the processing line 6 of the first planar member 11 on the rear face 4 of the object 1.

In this laser processing method, the processing scars 17 aligning along the line 5 are formed in the bonding layer 13 located closer to the second planar member 12 than is the first planar member 11. Therefore, even when the processing line 6 (modified region 7) of the first planar member 11 cannot directly be recognized from the second planar member 12 side, the irradiation position of the laser light L3 can be aligned with the processing line 6 of the first planar member 11 by recognizing the processing scars 17 from the second planar member 12 side by using an IR camera, for example, and setting the irradiation position of the laser light L3 with respect to the processing scars 17. That is, by using the processing scars 17 of the bonding layer 13 as a reference for alignment, this step S104 can irradiate the second planar member 12 with the laser light L3 along the processing line 6 (i.e., line 5).

Subsequently, as illustrated in FIG. 12, this step S104 locates the converging point P3 of the laser light L3 within the second planar member 12 while using the rear face 4 of the object 1 as an entrance surface for the laser light L3. In this state, the object 1 is moved relative to the laser light L3, so that the first planar member 11 is irradiated (scanned) with the laser light L3 along the line 5 (and the processing line 6). This forms the modified region 7 within the second planar member 12 along the line 5 (and the processing line 6). This step S104 forms the modified region 7 substantially throughout the length of the second planar member 12 by irradiating the object 1 from one end thereof to the other end with the laser light L3. This step S104 may also adjust the position at which the modified region 7 is formed in the thickness direction of the second planar member 12 or form a plurality of rows of modified regions 7 in the second planar member 12 according to the material and thickness of the object 1 including the second planar member 12, its desired cutting accuracy, and the like.

For example, a stress is applied along the line 5 to the object 1 in which the modified regions 7 are formed in the first and second planar members 11, 12 along the line 5, so as to cut the object 1 from the modified regions 7 acting as start points.

As explained in the foregoing, the laser processing method in accordance with the first embodiment irradiates the first planar member 11 with the laser light L2, so as to form the modified region 7 in the first planar member 11 along the line 5, and irradiates the bonding layer 13 connecting the first and second planar members 11, 12 to each other with the laser light L1, so as to form the processing scars 17 in the bonding layer 13 along the line 5. When processing the modified region 7 in the second planar member 12, the processing scars 17 formed in the bonding layer 13 are used as a reference for alignment, so as to irradiate the second planar member 12 with the laser light L3 along the line 5 (i.e., processing line 6), thereby forming the modified region 7 in the second planar member 12 along the line 5 (i.e., processing line 6).

Therefore, even when the bonding layer 13 is made of a material which is hard to transmit light therethrough such as a metal or a predetermined resin, the processing line 6 formed earlier in the first planar member 11 and the processing line formed later in the second planar member 12 can accurately be aligned with each other. Consequently, this laser processing method can restrain the processing quality from lowering.

In particular, before forming the modified region 7 in the first planar member 11, the laser processing method in accordance with this embodiment irradiates the bonding layer 13, which is located on the inner side of the object 1 than is the first planar member 11, with the laser light L1, so as to form the processing scars 17. This can deter the processing scars 17 of the bonding layer 13 from adversely affecting the modified region 7 being formed in the first planar member 11 by irradiation with the laser light L2 from the first planar member 11 side.

Before cutting the object 1, the laser processing method in accordance with this embodiment forms damage scars (processing scars 17) along the line 5 in the bonding layer 13 bonding the first and second planar members 11, 12 to each other. This makes it easier to cut the bonding layer 13 itself along the line 5 when cutting the object 1, whereby the processing quality can be improved.

Second Embodiment

Figure 13:
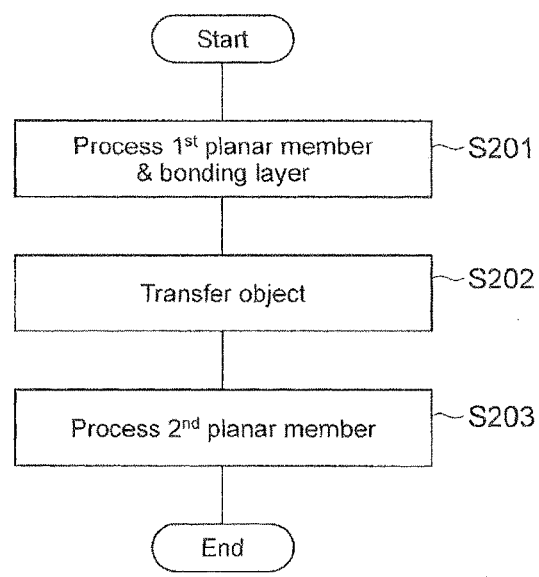
FIG. 13 is a flowchart illustrating main steps of the laser processing method in accordance with a second embodiment.

The laser processing method in accordance with the second embodiment of one aspect of the present invention will now be explained. The laser processing method in accordance with this embodiment also cuts an object to be processed constructed by attaching a pair of planar members to each other as with the laser processing method in accordance with the first embodiment. FIG. 13 is a flowchart illustrating main steps of the laser processing method in accordance with the second embodiment. This laser processing method also prepares the object 1 at first as illustrated in FIG. 8 (first step).

Subsequently, as illustrated in FIGS. 13 and 14, the first planar member 11 and bonding layer 13 are processed at the same time (step S201: second and third steps). FIG. 14 is a diagram for explaining a step of processing the first planar member and bonding layer. In particular, FIG. 14(b) is a partial sectional view taken along the line XIV-XIV of FIG. 14(a). This step S201 forms a modified region 7 in the first planar member 11 and processing scars 17 in the bonding layer 13 by irradiating the first planar member 11 and bonding layer 13 with laser light L4 from the first planar member 11 side.

More specifically, this step S201 initially attains a state where the front face 3 of the object 1 is used as an entrance surface for the laser light L4 such that a converging point P4 of the laser light L4 is located within the first planar member 11 while the bonding layer 13 is irradiated with leak light (laser light) L5 of the laser light L4. In this state, the object 1 is moved relative to the laser light L4, so as to irradiate (scan) along the line 5 the first planar member 11 with the laser light L4 and the bonding layer 13 with the leak light L5 of the laser light L4.

This forms the modified region 7 within the first planar member 11 along the line 5 and the processing scars 17 within the bonding layer 13 along the line 5. This step S201 forms the modified region 7 and processing scars 17 substantially throughout the length of the first planar member 11 and bonding layer 13 by irradiating the object 1 from one end thereof to the other end with the laser light L4. This step S201 may also adjust the position at which the modified region 7 is formed in the thickness direction of the first planar member 11 or form a plurality of rows of modified regions 7 in the first planar member 11 according to the material and thickness of the object 1 including the first planar member 11, its desired cutting accuracy, and the like.

The following steps of this laser processing method are the same as those of the laser processing method in accordance with the first embodiment. That is, this laser processing method also transfers (reverses) the object 1 as illustrated in FIGS. 8 and 11 (step S202) and then irradiates the second planar member 12 with the laser light L3 from the second planar member 12 side as illustrated in FIGS. 8, 11, and 12, so as to form the modified region 7 in the second planar member 12 (step S203: fourth step). Then, a stress is applied to the object 1 along the line 5, so as to cut the object 1 from the modified region 7 acting as a start point.

Because of the same reason as with the first embodiment, the foregoing laser processing method in accordance with the second embodiment can accurately align the processing line 6 of the first planar member 11 with the processing line of the second planar member 12 even when the bonding layer 13 is made of a material which is hard to transmit light therethrough, thereby restraining the processing quality from lowering.

In particular, the laser processing method in accordance with the second embodiment can simultaneously perform the step of forming the modified region 7 in the first planar member 11 and the step of forming the processing scars 17 in the bonding layer 13, thereby shortening the total processing time.

The foregoing embodiments explain one mode for carrying out the laser processing method in accordance with one aspect of the present invention. Therefore, the laser processing method in accordance with one aspect of the present invention is not limited to the laser processing methods in accordance with the first and second embodiments mentioned above. The laser processing method in accordance with one aspect of the present invention may arbitrarily change the laser processing methods in accordance with the first and second embodiments mentioned above within the scope not departing from the gist of each claim.

For example, while the laser processing methods in accordance with the first and second embodiments form the processing scars 17 throughout the length of the bonding layer 13 in the steps S101 and S201, the processing scars 17 may be formed in only a part of the bonding layer 13 along the line 5, since it is sufficient for the processing scars 17 of the bonding layer 13 to be usable as a reference for alignment when processing the second planar member 12 in a later step.

While the laser processing methods in accordance with the first and second embodiments are used for setting the line 5 extending from one end of the object 1 to the other end thereof and cutting the object 1 along the line 5, the laser processing method in accordance with one aspect of the present invention is not limited thereto. The laser processing method in accordance with one aspect of the present invention can be applied to laser processing for cutting off a part of the object 1 therefrom, for example, such as to gouge out the object 1 into a desirable form. In this case, it will be sufficient if a line to process is set in the object 1 according to the desirable position and form to be cut off.

INDUSTRIAL APPLICABILITY

One aspect of the present invention can provide a laser processing method which can restrain the processing quality from lowering.

REFERENCE SIGNS LIST

1: object to be processed; 3: front face; 4: rear face; 5: line to cut (line to process); 7: modified region; 11: first planar member; 12: second planar member; 13: bonding layer; 17: processing scar; L1, L2, L3, L4: laser light; L5: leak light.

The invention claimed is:
1. A laser processing method comprising:
a first step of preparing an object to be processed having first and second planar members stacked on top of each other and a bonding layer, arranged between the first and second planar members, bonding the first and second planar members to each other, the object being set with a line to process;
a second step of forming a modified region in the first planar member along the line by irradiating the first planar member with laser light along the line while using a front face of the object on a side opposite from the bonding layer in the first planar member as a laser light entrance surface;

a third step of forming a processing scar in the bonding layer along the line by irradiating the bonding layer with laser light along the line while using the front face of the object as a laser light entrance surface; and a fourth step, after the first to third steps, of forming a modified region in the second planar member along the line by irradiating the second planar member with laser light along the line while using a rear face of the object on a side opposite from the bonding layer in the second planar member as a laser light entrance surface;

wherein the fourth step irradiates the second planar member with the laser light along the line by using the processing scar formed in the bonding layer as a reference for alignment of a laser light irradiation position with respect to the second planar member.

2. A laser processing method according to claim 1, wherein the modified region is formed in the first planar member by performing the second step after forming the processing scar in the bonding layer by performing the third step.

3. A laser processing method according to claim 1, wherein the third step is performed by irradiating the bonding layer with leak light of the laser light irradiating the first planar member when performing the second step, so as to form the processing scar in the bonding layer.

\* \* \* \* \*